(12) United States Patent
Altman et al.

(10) Patent No.: US 7,416,646 B2
(45) Date of Patent: Aug. 26, 2008

(54) FLY ASH TREATMENT BY IN SITU OZONE GENERATION EMPLOYING A VENTURI

(75) Inventors: Ralph F. Altman, Chattanooga, TN (US); Sam Rosen, Baltimore, MD (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 956 days.

(21) Appl. No.: 10/782,465

(22) Filed: Feb. 19, 2004

(65) Prior Publication Data

US 2004/0184974 A1      Sep. 23, 2004

Related U.S. Application Data

(60) Continuation-in-part of application No. 10/023,184, filed on Dec. 18, 2001, now Pat. No. 6,783,739, which is a division of application No. 09/653,236, filed on Aug. 31, 2000, now Pat. No. 6,395,145.

(51) Int. Cl.
*B01J 19/08* (2006.01)
(52) U.S. Cl. ....................................... 204/164
(58) Field of Classification Search ................... 204/164
See application file for complete search history.

(56) References Cited

U.S. PATENT DOCUMENTS

| 4,227,894 A | 10/1980 | Proynoff |
| 4,251,234 A * | 2/1981 | Chang ............................. 95/78 |
| 4,559,467 A | 12/1985 | Beckman et al. |
| 4,657,738 A | 4/1987 | Kanter et al. ........... 422/186.04 |
| 5,008,087 A | 4/1991 | Batchelor |
| 5,169,606 A | 12/1992 | Batchelor ............... 422/186.19 |
| 5,445,798 A | 8/1995 | Ikeda et al. |
| 6,074,458 A | 6/2000 | Bittner et al. ................... 95/60 |
| 6,136,089 A | 10/2000 | Hurt et al. |

* cited by examiner

*Primary Examiner*—Kishor Mayekar
(74) *Attorney, Agent, or Firm*—Curatolo Sidoti Co., LPA

(57) ABSTRACT

Disclosed is a method of treating, fly ash having an unacceptably high concentration of carbon, with ozone produced in situ by corona discharge. This method will allow high carbon-content fly ash to be used with air entrainment agents as an additive to cement. The corona discharge can be produced in the exhaust pipe with a venturi of various combustion systems. The device of this invention can be used in conjunction with a triboelectric carbon-fly ash separation system or in a conventional combustion system. The corona discharge is produced off of sharp-tipped metal devices. A venturi is used in the exhaust pipe in the exhaust pipe in conjunction with the sharp-tipped metal devices.

16 Claims, 5 Drawing Sheets

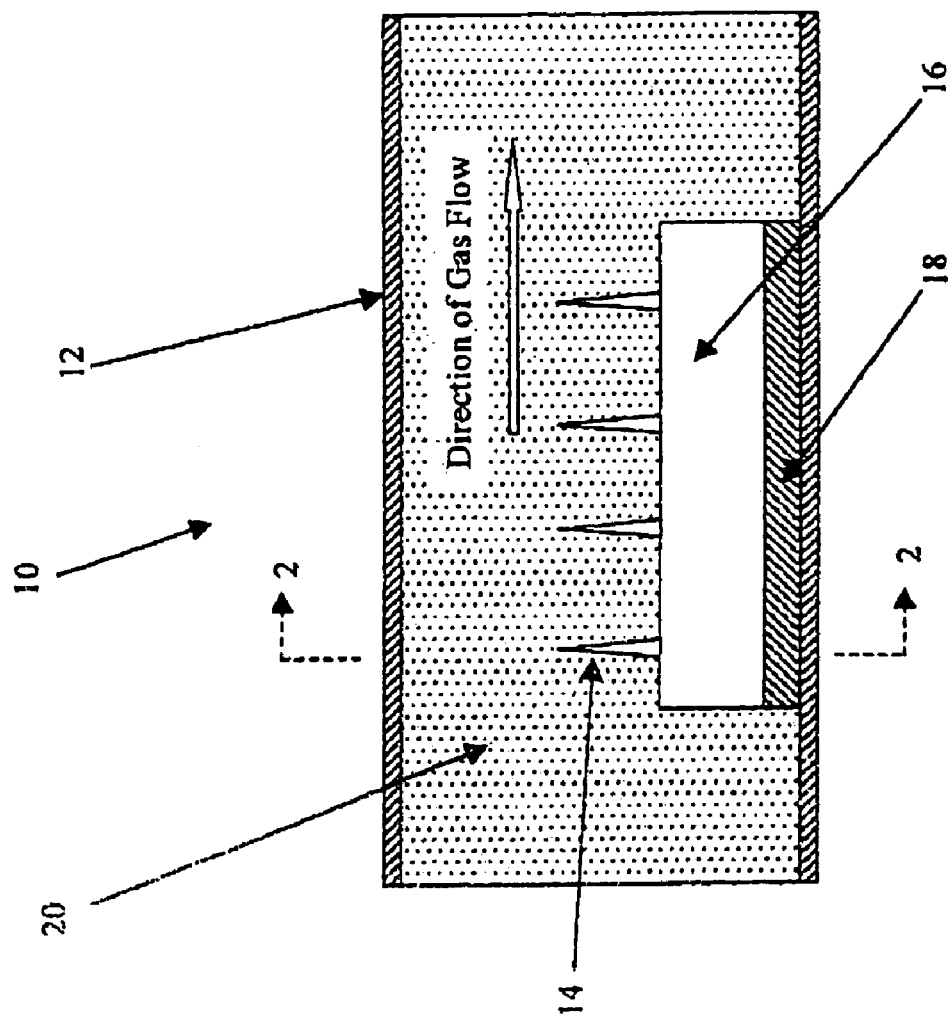
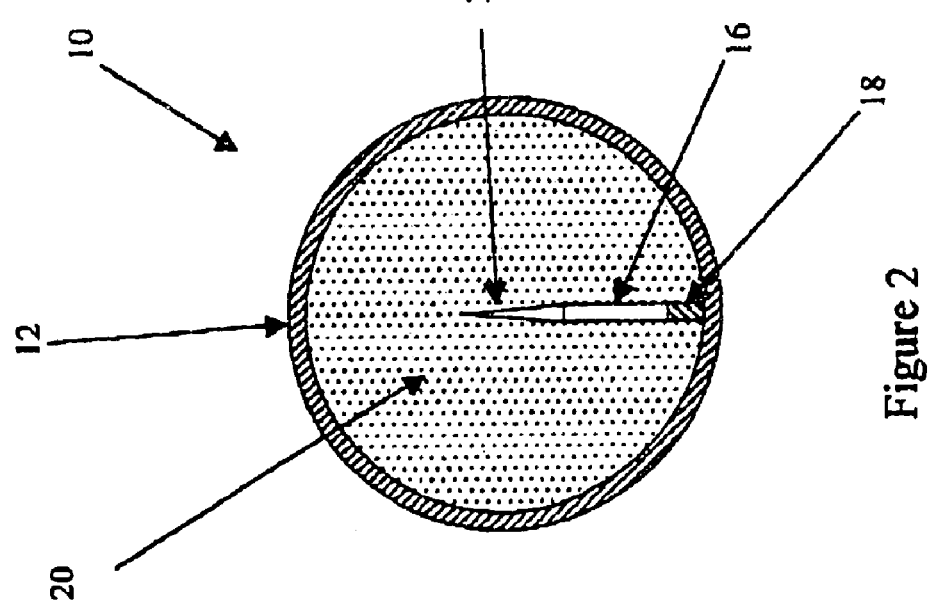

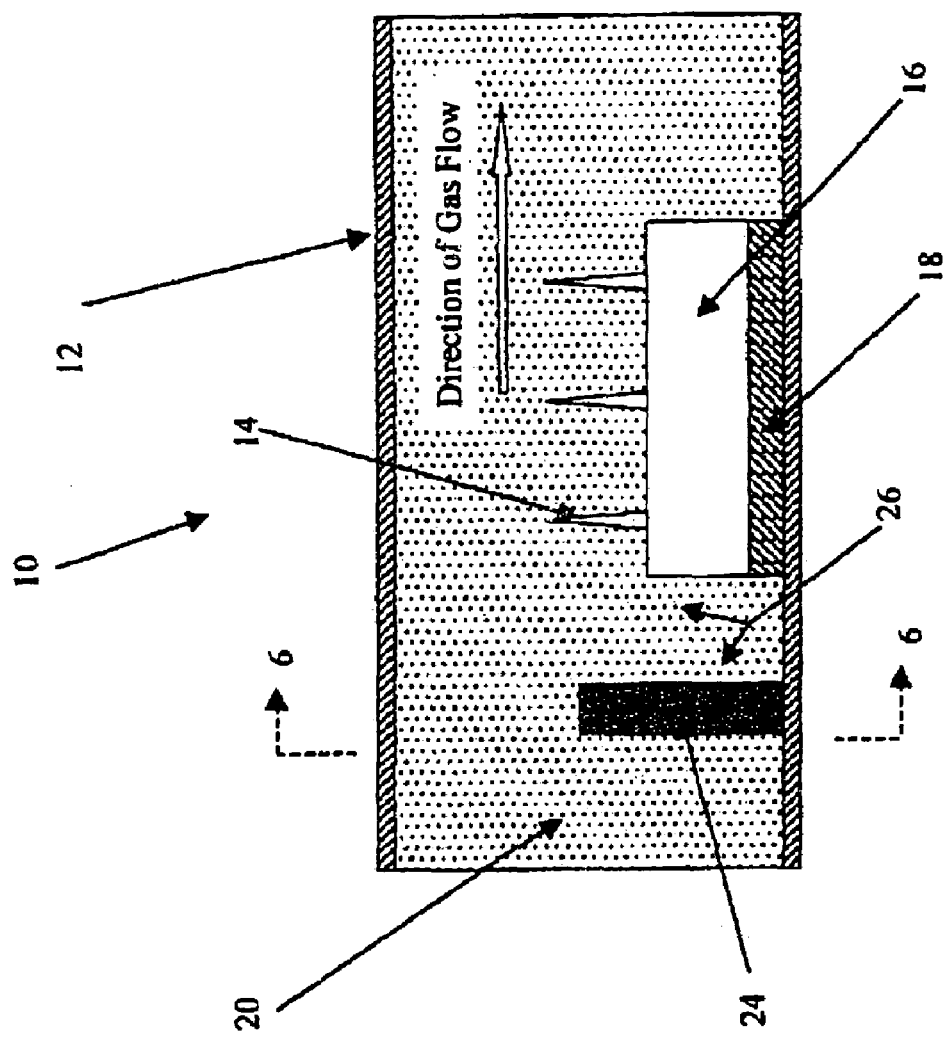
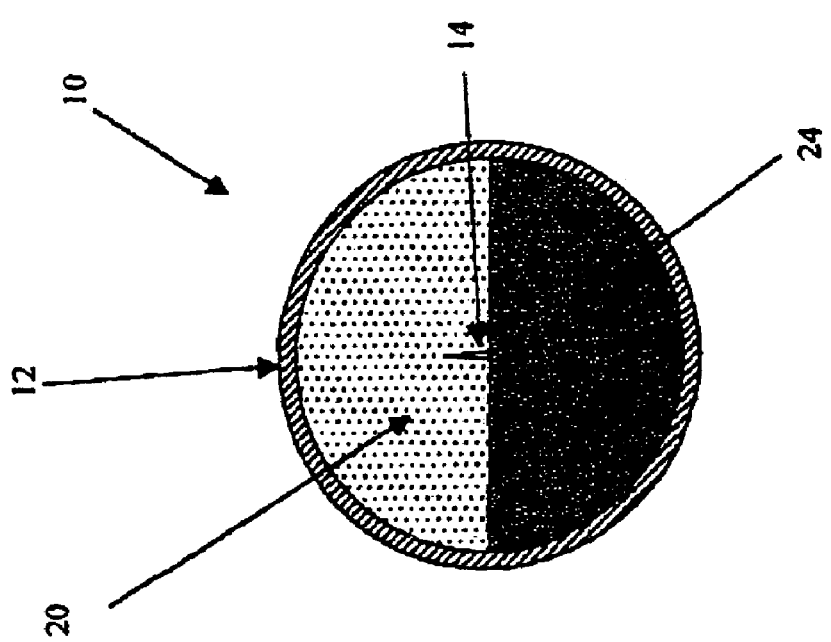
Figure 5
Figure 6

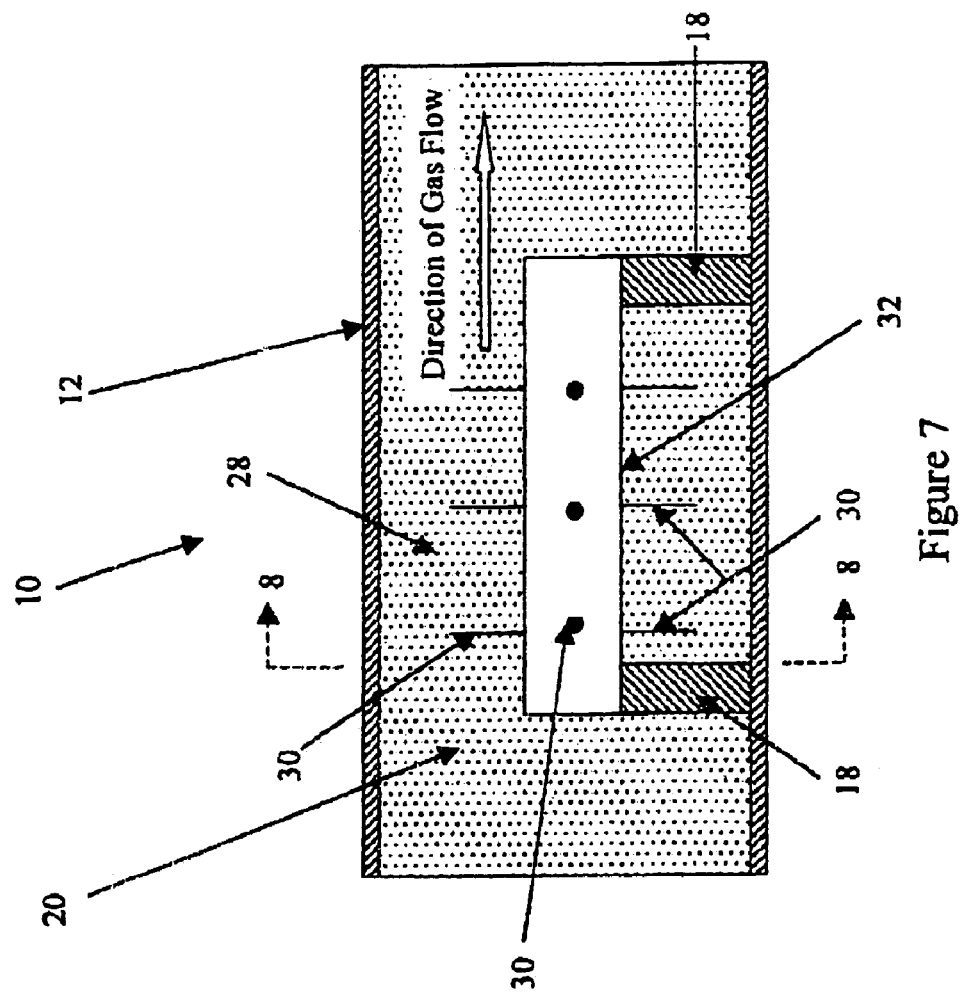
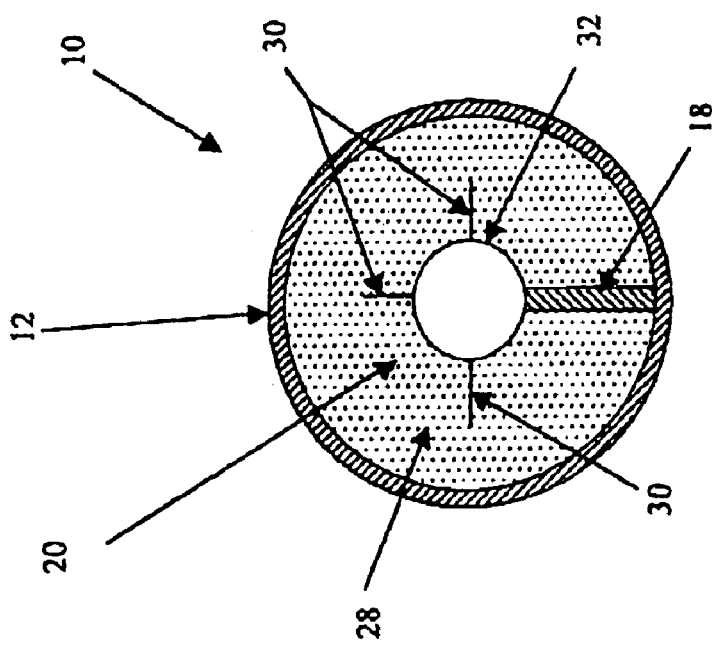

FLY ASH TREATMENT BY IN SITU OZONE GENERATION EMPLOYING A VENTURI

RELATED APPLICATIONS

This application is a continuation-in-part of Ser. No. 10/023,184 filed Dec. 18, 2001 now U.S. Pat. No. 6,783,739, which was a division of Ser. No. 09/653,236 filed Aug. 31, 2000, now U.S. Pat. No. 6,395,145.

FIELD OF THE INVENTION

The invention finds applicability in producing more effective additives for cement and concrete formulations. More specifically fly ash is improved for use as an additive to cement.

BACKGROUND OF THE INVENTION

Large quantities of coal are burned world wide. Typically, coal is ground to a fine powder, conveyed to the boiler and burned to produce steam to power turbines which generate electricity. A by-product of this coal combustion is a fly ash residue. During the combustion process inert clay and shale minerals in the fly ash react with lime to form cementacious materials. This pozzolanic property of fly ash is exploited. That is, fly ash incorporated into cement reacts with free lime during the concrete forming process to produce a cement forming a stronger concrete. Using fly ash as a pozzolan in concrete saves on the amount of cement to be used. There is a caveat however to using fly ash in concrete. The American Society for Testing and Material specifies a carbon content in fly ash of less than 6% as being useable in cement. It would be advantageous to employ fly ash having higher concentrations of carbon as a fly ash additive in cement to make concrete. The herein disclosed invention addresses this problem and offers a solution.

It is known in the art to treat fly ash containing higher levels of carbon with ozone to make the fly ash with a higher level carbon useable in cement. This ozone treatment of fly ash is referred to in the art as pacification. When pacifying fly ash, the prior art has employed an ozone generated by an external source. The elimination of this prior art external ozone generation system is a main goal of the present invention. As described, reacting ozone with high carbon fly ash produced by the combustion of fossil fuels will pacify the carbon and make it possible to use high carbon fly ash as a concrete additive.

The herein disclosed invention recognizes that processes designed to reduce carbon in fly ash are often remiss in not effectively reducing the carbon content to acceptable levels. The herein disclosed invention is designed to remedy the problem of insufficient or inefficient carbon reduction of fly ash. An example of a process in which carbon in fly ash may not be sufficiently reduced is in a triboelectric process for reducing carbon in fly ash.

OBJECTS OF THIS INVENTION

An object of this invention is to efficiently produce a fly-ash product which will have a beneficial effect on concrete.

A further object of this invention is to conveniently produce a fly ash composition allowing a higher carbon-content fly ash and acceptable levels of air entrainment agents to be used in concrete.

A significant object of this invention is a method for producing ozone treated fly ash in the exhaust gas stream during coal combustion.

A main object of this invention is to pacify fly ash with unacceptably high levels of carbon produced in triboelectric process, however, this invention could be used in any pneumatic system that is used to transport fly ash.

An important object of this invention is the enhancement of means for producing ozone in an ash stream to treat fly ash.

These and other objects of the present invention will become apparent from a reading of the following description taken in conjunction with the enclosed drawings.

Prior Art Patents

Kanter et al (U.S. Pat. No. 4,657,738) teaches a stack gas emissions control system for electrostatically removing pollutants from the gas.

Batchelor (U.S. Pat. No. 5,169,606) teaches the production of ozone using the corona discharge between electrodes.

Bittner et al (U.S. Pat. No. 6,074,458) teaches an apparatus for separating carbon particles from fly ash in which a triboelectric separator is employed.

BRIEF SUMMARY OF THE INVENTION

Marketing fly ash for use as an additive in concrete is an important economic issue for the utility industry. However, the presence of unburned carbon in fly ash can limit fly ash use as a concrete additive. The limitation on the use of fly ash is not caused by the adverse affect that carbon has on concrete properties, but rather by the affect carbon has on air entrainment agents that are used in concrete mixtures. Carbon reacts with these agents rendering them ineffective as air entrainment agents. The affect becomes more pronounced and more sensitive to carbon concentration as the carbon concentration increases. The problem can be overcome by adjusting the amount of air entrainment agent frequently to match the carbon concentration of the fly ash, but this adds a level of complexity to the process that is not acceptable to concrete manufacturers. Generally, fly ash with a carbon content of greater than 3% cannot be sold in today's market as an additive for concrete.

Recent research indicates that exposing the surface of carbon in fly ash to ozone will "pacify" the surface of the carbon so that it no longer reacts with commonly used air entrainment agents. This discovery means that ozone-treated ash with a higher carbon content could be used in concrete without the need to increase the amount of air entrainment agent. In other recent research, it has also been discovered that a low carbon ash can be produced by using a triboelectric ash separation process. This process produces a stream of "product" ash lower in carbon than the parent ash. This ash product with lower carbon content leaves the separation chamber entrained in a transport gas stream. As a result of this separation process, the ash particles carry a significant negative charge. It is pointed out, however, that the ash produced in the triboelectric process while reducing carbon content, will often times still have an unacceptably high carbon content. The herein disclosed invention describes a method of adding ozone to the entrained ash/carrier gas stream to pacify the unacceptably high carbon-content remaining in the ash after triboelectric separation. This approach makes it possible to relax the upper limit of the carbon in the ash and, thereby, increase the fraction of saleable ash produced by the separation process. In fact, adding ozone to the outlet product stream by any means will accomplish this goal. The ozone could be generated externally and injected into the piping that carries the ash from the separation chamber to the storage silo. The herein disclosed invention eliminates the need for external generation and injection of ozone.

In the normal combustion of coal, fly ash particles are produced. These fly ash particles contaminated with carbon are entrained in an air stream that flows through an exhaust pipe. The mixture of ash/carbon has a net negative charge. As part of the improvement of the herein disclosed invention, metal plates, electrically insulated from the pipe are inserted into the exhaust pipe. These plates are provided with sharp metal spikes attached thereto. As the negatively charged ash particles strike the plate, they impart a charge to the surface of the plate. In time, sufficient charge will accumulate on the plate to produce a substantial electric field around the plate. The electric field will be intensified at the tips of the sharp spikes, and when the charge on the plate is high enough, a corona discharge will begin at the tips of the spikes. The corona discharge will produce ozone. This discharge will bleed charge from the plate, and a steady-state condition will be established, whereby the charge deposited on the plate by ash particles that continue to strike the plate will be matched by the charge leaving the plate through the corona discharge. That is, an equilibrium condition will be reached wherein the rate of charge loss through the corona discharge will equal the rate of charge deposition due to turbulent charged particle impact.

It is well known that a negative corona in air produces ozone. In fact, some commercial ozone generators use a negative corona discharge to produce ozone. Hence, the corona discharge in the pipe transporting the air with entrained, charged ash particles will spontaneously generate ozone. Adding insulated metal plates with spikes in the exhaust pipe will eliminate the need for an external ozone generator to supply ozone to high carbon content fly ash.

The herein disclosed invention discloses alternate processes that do not require the use of an external ozone generator. In a first embodiment a number of metal structures are inserted into the transport pipe in such a manner that they are electrically insulated from the transport pipe. Each metal structure has one or more sharp edges or points with a very fine radius. As the charged particles in the pipe strike the metal, they deposit a charge. This process will, in time, create a voltage potential between the metal surface and surrounding environment. When this potential is high enough, a corona discharge will occur at the shaped edges of the metal structures that will spontaneously generate ozone.

Depending on the charge levels of the entering particles, the natural level of ozone generation may or may not be great enough to pacify the carbon in the ash. If the spontaneously generated charge and electric potential is insufficient, the metal structure can be connected to an external high-voltage power supply to enhance the rate of ozone generation. The use of a dielectric barrier on the discharge elements can be used to further enhance the rate of ozone generation. In either case, the sharp-edged components of the metal structure can be placed in protected flow zones to minimize fly ash abrasion. Therefore, only a hardened metal surface is exposed to ash impact. This approach will produce a simple, inexpensive system that will not require frequent replacement.

There are a number of patents covering the triboelectric ash beneficiation processes (to be supplied later). None of them relate to the use of ozone or any other agent to pacify the excessively high carbon remaining in ash.

As previously pointed out as an additive to cement, fly ash with a carbon content of 3% or less is desired. However, this low concentration of carbon is not easy to obtain or if obtainable is expensive and not economically feasible. One way of enabling higher carbon content fly ash to be used as a cement additive is to treat the higher carbon-content fly ash with ozone. A first embodiment of this invention entails taking a fly ash with a reduced carbon, but not a carbon content reduced sufficiently low to be a useful for adding air entrainment agents. That is, the carbon content of the fly ash is above the 3% acceptable level for adding air entrainment agents. At times the triboelectric separation process will produce fly ash of a carbon content of over 3%. In such cases adding ozone in situ to the higher carbon fly ash product by corona discharge will produce a useable product. Another embodiment of this invention contemplates use of insulated spiked metal plates as an ozone generator in conventional combustion systems generating ozone-treated fly ash by-product.

Said in another way the herein disclosed invention is directed to a process for treating negatively charged fly ash particles with unacceptably high levels of carbon which cannot be economically used as an additive to cement comprising turbulently subjecting in a gas stream containing said negatively charged fly ash particles with unacceptably high levels of carbon to a metal plate having at least one metal spike thereon to produce ozone through corona discharge wherein the ozone causes pacification of the fly ash with unacceptably high levels of carbon so that the fly ash can be efficiently used as an additive to cement. The method involves ozone produced by corona discharge in an exhaust tube, but instead of a tube any closed area wherein fly ash turbulence takes place would be operative.

In its broadest aspect the herein disclosed invention contemplates an electrostatic device producing ozone through corona discharge comprising sharp-tipped components placed on a conductive plate with an insulated bottom to be placed in a gas flow pipe. The sharp edged component can be a spike(s), wires or like metal pointed devices. The number of sharp edged components is not critical so long as adequate corona discharge to produce adequate amounts of ozone takes place.

Improvements have been made to the invention. The invention has been improved by including a venturi (a restriction) in the gas flow pipe. The venturi causes the fly ash particles to increase in speed and force when contacting the spikes in the gas flow pipe, thereby creating a greater corona discharge from the spikes and thereby producing more ozone for fly ash treatment.

BRIEF DESCRIPTION OF THE DRAWINGS

Description of the figures:

FIG. 1 is a schematic view of a fly ash discharge pipe showing discharge spikes.

FIG. 2 is a cross-sectional view thereof taken along line 2-2 of FIG. 1.

Figure 3:
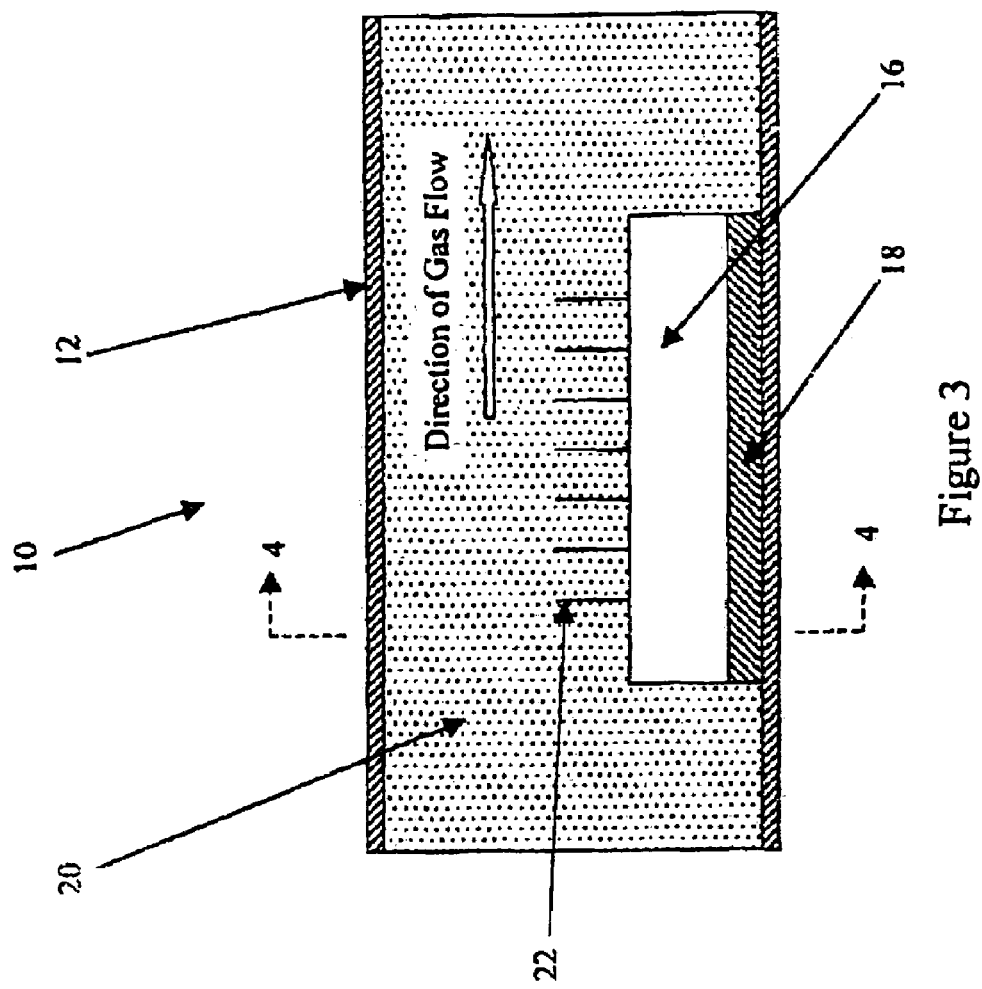

FIG. 3 is a schematic view of a fly ash discharge pipe showing discharge wires.

Figure 4:
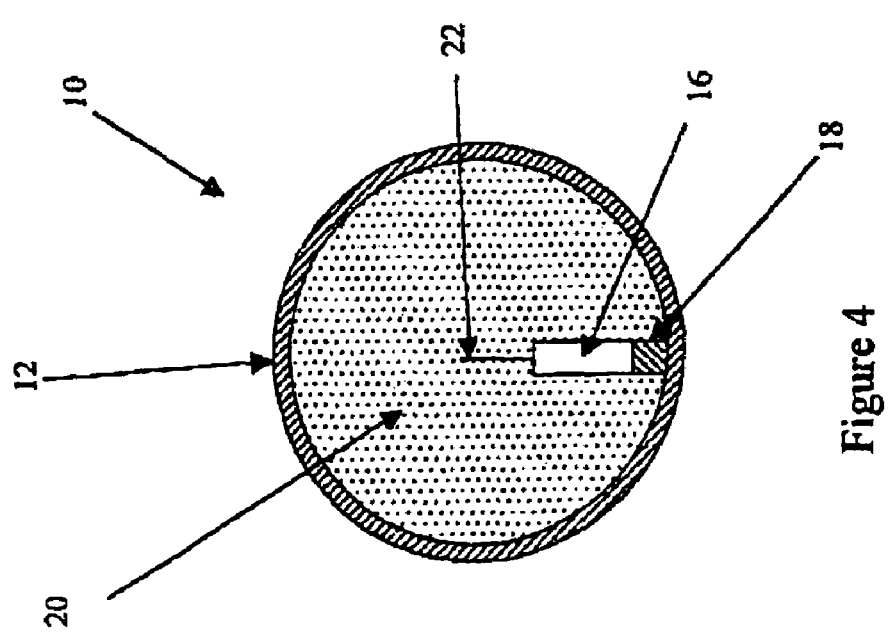

FIG. 4 is a cross-sectional view thereof taken along line 4-4 of FIG. 3.

FIG. 5 is a schematic view of a fly ash discharge pipe showing a protective barrier.

FIG. 6 is a cross-section taken along line 6-6 of FIG. 5.

FIG. 7 is a schematic view of an alternative embodiment of a fly ash discharge pipe showing discharge wires placed radially.

FIG. 8 is a cross-section taken along line 8-8 of FIG. 7.

Figures 9, 10:
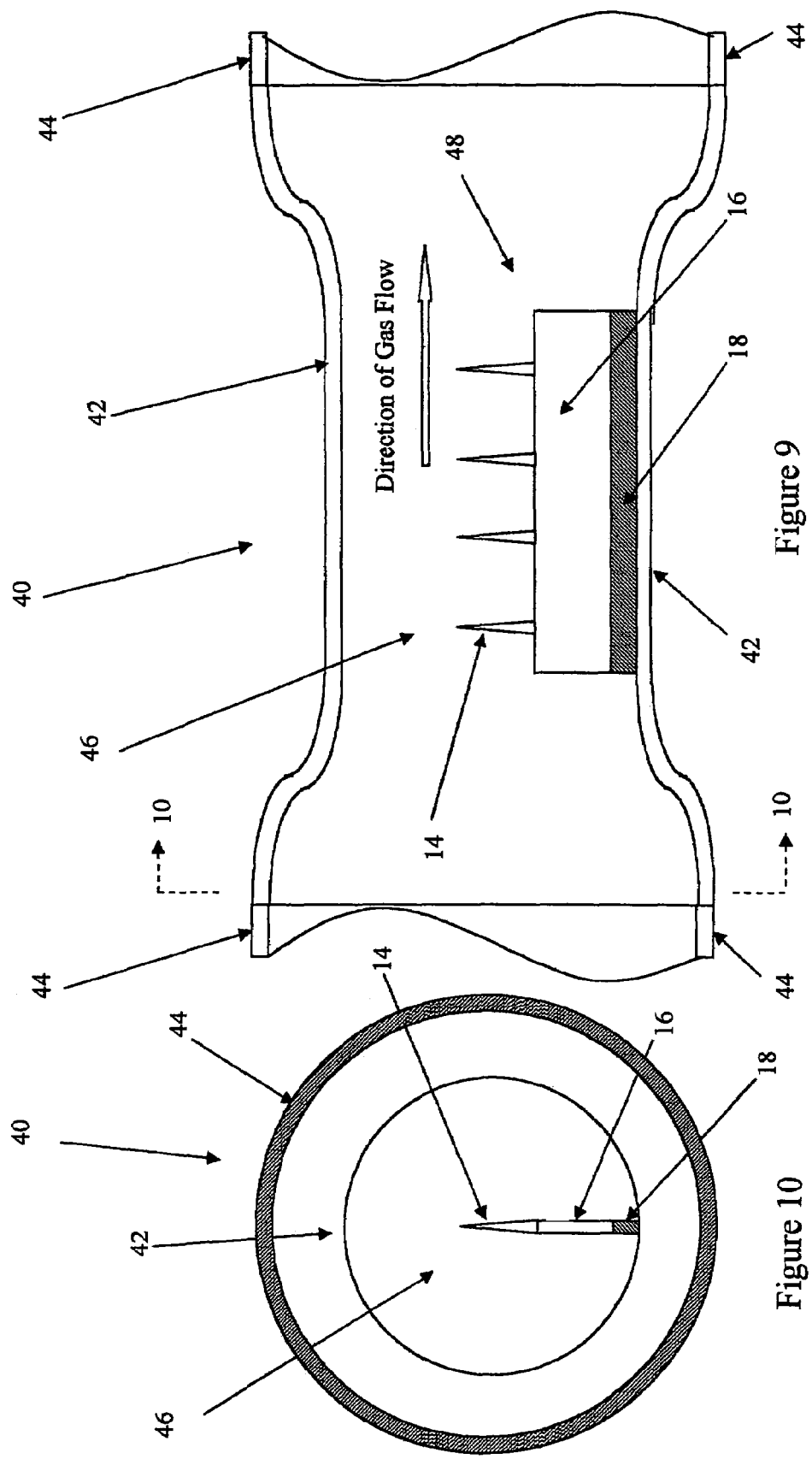

FIG. 9 is a schematic view of a venturi disposed in a fly ash discharge pipe.

FIG. 10 is a cross-section taken along line 10-10 of FIG. 9.

In FIGS. 9 and 10 new components of the device have been given new numbers; for old components, their original numbers have been maintained.

The arrangement of spikes as shown in FIGS. 5-8 could be included in a venturi with the same beneficial results.

DETAILED DESCRIPTION OF THE INVENTION

With reference to FIG. 1 an in situ ozone generator system 10 has an exhaust pipe 12, spikes 14 set on a plate 16 which in turn is set on an insulator 18 attached to the exhaust pipe 12. Exhaust gas with entrained fly ash 20 with a negative charge travels in the direction of the arrow exiting pipe 12 of the ozone generator 10.

The inventor envisions several different embodiments and configurations of the corona discharge device for producing ozone. While in FIGS. 1 and 2, spikes 14 are illustrated, the corona discharge device, as shown in FIGS. 3 and 4, could be made of thin wires 22 mounted on a metal plate 16 which in turn is mounted on an insulator 18.

In addition as shown in FIGS. 5 and 6, there can be placed a barrier or baffle 24 in the pipe which will provide a protected flow zone 26 and will serve to minimize fly ash abrasion of exposed metal parts. The baffle 24 could be made of any abrasion-resistant material such as ceramic or other such material which resists abrasion.

With reference to FIGS. 7 and 8, an alternate configuration 28 for the placement of wires in the pipe 12 is shown. In this configuration the wires 30 are placed radially. Instead of a flat plate for holding the wires, a metal cylinder 32 mounted on an insulator base 18 can be used. In all of the alternative embodiments for the placing the spikes or wires, the important consideration is that a corona discharge for producing ozone takes place.

As a further alternative embodiment of this invention, the inventor conceptualizes the insulator, metallic surface and sharp-tipped components to circumferentially surround the inside of the pipe.

The in situ ozone generator finds applicability when used in the exhaust tube of triboelectric separator which separates carbon particles from fly ash. The ozone generator 10 of this invention is designed to pacify fly ash with a carbon content unacceptably high for use in cement.

Triboelectric separation of carbon from fly ash per se is old and does not form part of this invention. (See for example U.S. Pat. No. 6,074,458 to Bittner et al.)

While the ozone generator system 10 is intended to be used primarily with a triboelectric separation system, it can also be used to pacify ash from low NOx burners which produce unacceptably high levels of carbon in fly ash, as well as, ash from other burners producing fly ash with unacceptably high levels of carbon.

In its broadest aspect, the inventor has developed a corona discharge device composed of a sharp-tipped component such as a spike or wire insulated from the pipe. The sharp-tipped component has points of a very small diameter. For example, the tip-point of the spike has a diameter of less than 0.05 inch. The spike with an insulated end can be fitted onto the internal surface of a pipe, which in turn can be fitted onto the discharge end of a triboelectric fly ash carbon reducing system. As understood by those skilled in the art, the pipe disposed with the insulated spike or wire can be incorporated into any combustion system which produces fly ash with unacceptably high levels of carbon to pacify the fly ash.

With reference to FIGS. 1 and 2: The metal transport pipe 12 can be 4 to 18 inches in diameter. In the figures shown, the pipe is six inches in diameter. The length of the pipe is not critical, but could be from 5 feet to as long as 100 feet or longer. The pipe 10 can contain numerous metal plates 16 with spikes 14. Only one such plate 16 is shown in FIG. 1 for clarity. The metal plate 16 can be 12 inches long and one-fourth the diameter of the tube. In FIG. 1 there are four spikes shown; however, the number of spikes is not critical. The spikes are mounted on a discharge plate which, in turn, is mounted on an insulator. The overall length of the plate and spike structure is somewhat longer than the radius of the tube. The spikes 14 will stand about one-fourth the diameter of the pipe. The radius at the end of the tip of the spike is less than 0.05 inches in diameter.

The pipe 12 can be made of mild steel or any material suitable for transporting fly ash entrained in air or exhaust gas. The plate 16 is made of hardened or mild steel, and the spikes or wires are made of hardened steel to resist abrasion.

The metal structure could be placed directly in the gas flow as illustrated in FIG. 1, or it could be located behind a baffle (protected flow zone) to reduce abrasion by ash particles FIG. 7. The baffle would be made of an abrasion-resistant material such as a ceramic.

A number of variations to this basic concept are possible. First, the insulated metal structures do not have to be plates. Any shape with a large surface area will do. However, there must be a sharp spike somewhere on the insulated metal structure. In addition, the sharp spikes can take many different forms. They can, for example, be fine wires. Finally, if the charge on the fly ash particles is not high enough to produce an electric field at the tip of the spikes which is high enough to produce a corona discharge, the field can be increased by connecting the metal structure to an external voltage supply that will raise the electric field on the metal structure.

The inventor also envisions his ozone generating device to be mounted in a non-metallic, non-conducting pipe or tube. In such an installation the metallic sharp-tipped component mounted on the metal plate or surface does not, in turn, have to be mounted on an insulator since the non-metallic pipe is non-conducting. Accordingly, the metallic sharp-tipped component mounted on a metal surface is placed in the non-metallic pipe to produce the corona effect to produce ozone to treat the fly ash.

Once the fly ash has been subjected to ozone treatment it can be shipped to a storage area or can be subjected to other treatment.

The in situ ozone generator system has been improved by the use of a venturi restriction in the exhaust pipe. This improvement is best shown in FIGS. 9 and 10.

The venturi is based on the principle that different flow velocities produce different amounts of pressure. The velocity at the waist or throat of the venturi is higher than at either of the sections on either side of the waist or throat. Since the difference in pressure between the venturi and that at either side of the venturi depends on the flow velocity, it must also depend on the quantity of fluid (gas) passing through the pipe per unit of time (flow rate in cu. ft./sec.=cross-sectional area of pipe in ft.$^2$× flow velocity in ft./sec.). Downstream of the venturi, the velocity of the gas is reduced and the pressure in the pipe restored to the value it had before passing through the constriction. The improvement of the herein disclosed invention avails itself of the venturi effect which produces enhanced contact between fly ash particles and the metal surface of the spikes. The spikes can be placed in the throat of a venturi in the flu gas transport pipe. This refinement will increase the rate of collisions of charged particles with metal surface and the higher collision rate will increase the intensity of the corona discharge and thereby the rate of ozone generation. Furthermore, the use of a venturi shaped throat will minimize the increase in pressure drop caused by using this approach to enhance performance.

The velocities: The velocity in the transport line (pipe 12) will be in the 40 to 80 ft./sec. range. The velocity in the throat of the venturi 42 will be two to four times the velocity in the transport line. Accordingly, in operation in the venturi, the fly ash containing gas streams will flow at a rate of 80 to 320 ft/per second.

Note that in FIGS. 9 and 10, new components have been given new identification numerals. Where specific components are not new, old identification numerals have been maintained.

As described in FIGS. 9 and 10, the improved invention involves a venturi-containing fly ash discharge pipe 40 having a venturi 42 disposed in the exhaust gas stream 46 which contains fly ash. Note particularly that as illustrated in FIG. 9, the venturi 42 is produced by constricting pipe 44, the constriction produces a venturi throat or waist. The spike containing device 48 is comprised of spikes 14, plate 16 and insulator 18 are placed within the venturi 42 through which exhaust gas containing fly ash 46 flows.

Obviously, many modifications may be made without departing from the basic spirit of the present invention. Accordingly, it will be appreciated by those skilled in the art that within the scope of the appended claims, the invention may be practiced other than has been specifically described herein.

The invention claimed is:

1. In a process for treating negatively charged fly ash with unacceptably high levels of carbon which cannot be economically used as an additive for cement comprising turbulently subjecting in a gas stream containing said negatively charged fly ash with unacceptably high levels of carbon to an ozone generator comprising an insulator having thereon a metal surface which has at least one metallic sharp-tipped component disposed thereon and wherein the ozone generator produces ozone through corona discharge causing pacification of the fly ash with unacceptably high levels of carbon so that the fly ash is efficiently used as an additive for cement, the improvement wherein:
said metallic sharp-tipped component is placed in a gas stream within a venturi to produce added speed to produce an enhanced corona discharge.

2. The process of claim 1 wherein the fly ash with unacceptably high levels of carbon was manufactured by a triboelectric carbon separation process to remove carbon from the fly ash but the carbon level of the fly ash still remains excessively high.

3. The process of claim 1 wherein the ozone is produced by corona discharge in an exhaust tube.

4. A method for supplying ozone to fly ash with excessively high levels of carbon in a gas stream resulting from combustion of fuel comprising:
employing a venturi in the gas stream to produce a corona discharge resulting in ozone generation in said gas stream thereby producing an ozone treated fly ash product requiring less air entrainment agent to produce an acceptable product for addition to cement in the manufacture of concrete.

5. The process of claim 4 wherein the fly ash is produced by a triboelectric process.

6. A process for treating negatively charged fly ash with unacceptably high levels of carbon comprising:
turbulently subjecting a gas stream containing the negatively charged fly ash to an electrostatic device, the electrostatic device comprising:
an optional insulator;
a metallic surface optionally mounted on the insulator; and
at least one metallic sharp-tipped component mounted on the metallic surface;
the electrostatic device being disposed within a venturi;
producing a corona discharge from the subjecting of the negatively charged fly ash to the electrostatic device;
producing ozone by the corona discharge; and
pacifying the fly ash with the ozone.

7. The process for treating negatively charged fly ash of claim 6,
wherein the metallic surface is cylindrical and the at least one metallic sharp-tipped component protrudes from the cylindrical surface.

8. The process for treating negatively charged fly ash of claim 6,
wherein the metallic sharp-tipped component is a spike coming to a sharp point or a wire coming to a sharp point.

9. The process for treating negatively charged fly ash of claim 6,
wherein the gas stream containing the negatively charged fly ash flows in a pipe;
wherein the electrostatic device is disposed in the pipe; and
wherein a baffle is disposed upstream of the electrostatic device, the baffle being adapted to prevent fly ash abrasion of the metallic parts of electrostatic device.

10. The process for treating negatively charged fly ash of claim 9,
wherein the electrostatic device is mounted in a non-metallic pipe, the pipe comprising the venturi.

11. A process for treating negatively charged fly ash with unacceptably high levels of carbon comprising,
establishing a flow of the negatively charged fly ash within a venturi the venturi containing a metallic plate having a flat surface and at least one metallic spike engaged with the flat surface,
contacting the at least one metallic spike with the flow of the negatively charged fly ash;
producing a corona discharge from the spike; and
producing ozone from the corona discharge.

12. The process for treating negatively charged fly ash of claim 11,
wherein the metallic plate is insulated from the venturi.

13. The process for treating negatively charged fly ash of claim 11,
wherein the at least one metallic spike comprises a series of wires or spikes.

14. A process for producing ozone for treating negatively charged fly ash comprising,
establishing a flow of negatively charged fly ash in a non-metallic pipe, wherein the pipe comprises a venturi;
contacting an electrostatic system with the flow of negatively charged fly ash, the electrostatic system comprising a metal surface and at least one metallic spike engaged with the surface, the electrostatic system being mounted in the non-metallic pipe;
imparting a charge to the at least one metallic spike, the charge being sufficient to produce a corona discharge; and
producing ozone from the corona discharge.

15. A process for producing ozone for treating negatively charged fly ash comprising,
establishing a flow of negatively charged fly ash in a channel, wherein the channel comprises a venturi;

impinging the flow of negatively charged fly ash upon an electrostatic system, the electrostatic system comprising a metal plate, the metal plate comprising either a) a flat surface and at least one metallic spike engaged with the flat surface, or b) a series of wires or spikes;

producing a corona discharge from the spike or wires; and producing ozone from the corona discharge.

16. The process for producing ozone of claim 15, wherein the metal plate is separated from the channel by an insulated base.

* * * * *